United States Patent [19]

Lock

[11] Patent Number: 5,451,868
[45] Date of Patent: Sep. 19, 1995

[54] CHANGEABLE DIVIDER AND INDEX FOR A VEHICLE SPEED AND DISTANCE TRANSDUCER INCLUDING A HALL EFFECT SENSOR

[75] Inventor: John A. Lock, Chicago, Ill.

[73] Assignee: Arthur Allen Manufacturing Company, Chicago, Ill.

[21] Appl. No.: 68,147

[22] Filed: May 28, 1993

[51] Int. Cl.[6] .......................... G01P 3/44; G01B 7/10
[52] U.S. Cl. .............................. 324/173; 324/207.2; 324/166; 324/174; 324/207.25
[58] Field of Search ............... 324/171, 166, 173, 174, 324/207.13, 207.2, 207.25; 338/32 R, 32 H

[56] References Cited

U.S. PATENT DOCUMENTS

| | | | |
|---|---|---|---|
| 3,732,494 | 5/1973 | Dragon | 324/207.25 |
| 3,846,697 | 11/1974 | Cila et al. | |
| 4,161,120 | 7/1979 | Cloarec | 324/173 |
| 4,167,699 | 9/1979 | Baker | 324/171 |
| 4,262,251 | 4/1981 | Fujishiro et al. | 324/207.25 |
| 4,401,946 | 8/1983 | Klimstra | 324/207.25 |
| 4,465,976 | 8/1984 | Avery et al. | |
| 4,518,918 | 5/1985 | Avery | |
| 4,609,990 | 9/1986 | Sember et al. | |
| 4,677,378 | 6/1987 | Tokura et al. | 324/207.13 |
| 4,745,363 | 5/1988 | Carr et al. | 324/207.2 |
| 4,746,791 | 5/1988 | Forkel | 324/207.13 |
| 4,859,941 | 8/1989 | Higgs et al. | |
| 4,902,970 | 2/1990 | Suquet | 324/207.25 |
| 4,907,445 | 3/1990 | Okumura | 324/173 |
| 4,982,155 | 1/1991 | Ramsden | |
| 4,992,731 | 2/1991 | Lorenzen | |
| 5,084,674 | 6/1992 | Lachmann et al. | |

*Primary Examiner*—Sandra L. O'Shea
*Assistant Examiner*—Roger C. Phillips
*Attorney, Agent, or Firm*—Hill, Steadman & Simpson

[57] ABSTRACT

A speed and/or distance transducer is mounted in a bolt-shaped hollow housing and is threaded into a transmission and locked in place with its detector and adjacent a toothed wheel which rotates to produce an electrical output. An indicia is provided on the head of the bolt to allow proper spacing of the end of the transducer relative to the toothed wheel. A divider converts the output of the detector and a switch with a rotary member can be accessed through a bolt opening to allow the divider ratio to be changed. A plug covers the opening after the dividing ratio has been selected.

1 Claim, 3 Drawing Sheets

CHANGEABLE DIVIDER AND INDEX FOR A VEHICLE SPEED AND DISTANCE TRANSDUCER INCLUDING A HALL EFFECT SENSOR

BACKGROUND OF THE INVENTION

1. Field of the invention

This invention relates in general to a vehicle speed and distance detector and particularly to a vehicle speed detector which includes a divider that can be changed from outside of the housing of the detector and also to an indexing means so as to control the position of the housing relative to a rotating gear.

2. Description of Related Art

Vehicle speed detectors are well known which operate with a transducer which comprises a pair of Hall detectors spaced apart and which can be mounted near a toothed wheel or gear that rotates with the wheels of the vehicle. Such tooth wheel or gear might be mounted, for example, in the transmission of a vehicle. As the toothed wheel or gear rotates relative to the Hall detector transducers, an electrical signal is produced by the Hall detectors which can be processed and supplied to a speedometer to indicate the vehicle speed or to an odometer to indicate the distance travelled.

Such prior art systems operate satisfactorily when the vehicle is travelling at a fair rate of speed, however, when the vehicle is travelling at a low rate of speed, often the output of the transducer is not sufficient to accurately drive the speedometer and other output devices.

See also U.S. Pat. Nos. 4,518,918, 4,992,731, 4,859,941, 4,982,155, 5,084,674, 4,465,976, 4,609,990, 3,846,697, 4,167,699, 4,907,445 and 4,161,120.

SUMMARY OF THE INVENTION

The present invention comprises a housing in the form of a bolt which can be threaded into an opening in the transmission housing and wherein one end of the bolt has Hall detectors which produce an output that is supplied through electrical circuitry to a divider. The divider changes the output frequency of the pulses detected by the Hall detectors and the divider of the invention can be controlled by a switch mounted in the housing which can be changed through the wall of the housing so as to vary the dividing ratio.

It is an object of the present invention to provide a divider mounted in a housing having the shape of a bolt wherein the dividing ratio of the divider can be changed through an access opening in the head of the bolt so as to vary the dividing ratio of the divider.

It is a feature of the invention that an access opening is formed in the head of the bolt through which access can be had to a switch so as to move the switch to different positions in order to change the dividing ratio of the divider. A plug is provided which can be removed for obtaining access to the switch and which after adjustment of the dividing ratio can be replaced into the housing to seal the access opening.

It is another object of the invention to provide indicia on the head of the bolt-shaped housing of the transducer which serves as a reference so that the threaded bolt-shape housing can be moved to engage the toothed wheel or gear after which the housing can be removed a short distance by using the indicia to indicate the spacing between the end of the detector device and the toothed wheel or gear.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

DETAILED DESCRIPTION OF THE PREFERRED EMBODIMENTS

Figure 1:
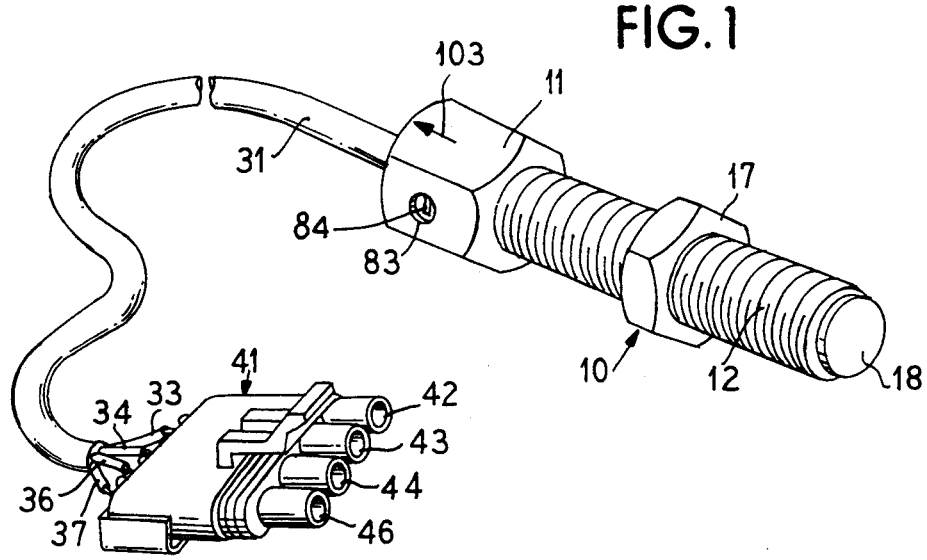
FIG. 1 is a perspective view of the novel vehicle speed and distance transducer according to the invention and illustrates the access hole for changing the divider ratio and also the indicia which used as an index.

FIGS. 1–4 are detailed views of the transducer according to the invention. Although the invention will be described with respect to a vehicle which has a gear or toothed wheel which rotates with the vehicles wheels, it is to be realized that the invention can be utilized in other applications where it is desired to determine the speed or position of a suitable gear shaft or other indicating parts. The invention comprises a bolt-shape housing 10 which has a threaded extending portion 12 and a head 11 such as a hexagonal head. A nut 17 is threadedly received on the bolt shaft 12 and is used to lock the device 10 in a particular longitudinal position relative to the transmission housing 16 illustrated in FIG. 4, for example. The transmission housing 16 is threaded and the threaded shaft 12 is threaded into the transmission housing 16 until the end 18 engages one of the teeth 14 of the toothed wheel 13. This adjustment is made when wheel 13 is stationary. The wheel 13 rotates to indicate the speed of the vehicle in use. After the end 18 has made engagement with a tooth 14, the bolt 10 is backed off using the indicia 103 formed on the bolt head 11 as an index. For example, if after contact is made by the end 18 with the gear tooth 14, the bolt 10 can be backed off one-half turn from the position of the indicia 103 when the end 18 engages the tooth 14 of the wheel 13. Then the look nut 17 can be tightened against the transmission housing 16 so as to lock the bolt 10 in a fixed predetermined relationship with the toothed wheel 13 so as to efficiently detect rotation of the wheel.

Mounted within the end 18, is a Hall detector 21 which may be of a common commercial type and which may comprise a pair of Hall detectors. U.S. Pat. No. 5,084,674, which issued on Jan. 28, 1992, describes in detail the Hall detector 21, which includes two hollow sensors. Such a unit is sold by the Siemens Corporation and is designated as a type TLE 4920G. The bolt 10 is hollow and is formed with an opening 24 into which circuit support 22 is received which carries the detector 21. A divider 26 and switch 81 are mounted on the supporting board 12 as are transistors T1 and T2. A voltage regulator 56 and a number of resistors and capacitors are also mounted on the board 22, but are not all shown in detail since they appear in the electrical schematic of FIG. 5. The end 18 is a cylindrical-shape member that has a wall 23 receivable in the hollow opening 24 of the bolt 12 when the unit is assembled. A cable 31 extends from the head 11 of the bolt 10 and carries the leads 33, 34, 36 and 37. The area about the cable 31 is sealed by plastic as it exits from the bolt head 11.

When the board 22 is in the assembled position with the end 18 in the end opening 24 of the bolt 12, the switch 81 will be aligned with an access opening 83 formed in the bolt head 11 such that the slot 84 of the rotary member 85 of the rotary switch 81 is aligned with the opening 83. Under these conditions, when a plug 87 is removed from the access opening 83, a tool 86 can be inserted into the opening 83 so that its end 89 is received in the slot 84 so that as the tool 86 is rotated, the rotary contact 82 of the switch 81 will rotate so as to select different dividing ratios from the divider 26 for the output and supply it to the output lead 34. A stop 200 may be formed in the switch 81 so that the switch contact 82 may be rotated from the stop 200 in one direction through all of the stepped positions to the stop 200. The user can identify the dividing ratio by noting the steps through which the switch rotor contact 82 has been turned. The discrete switch position gives a feel for each position.. After the desired selected dividing ratio has been selected with the tool 86, the tool 86 is removed from the access opening 83 and the plug 87 is inserted so as to seal the opening to prevent contaminants from entering into the inside of the bolt 10. The plug 87 may be plastic or it might be a threaded plug.

The cable 31 which contains the leads 33, 34, 36 and 37 may be connected to a connector 41 such as shown in FIG. 1 which has outputs 42, 43, 44 and 46 to which a mating connector can be attached.

Figure 5:
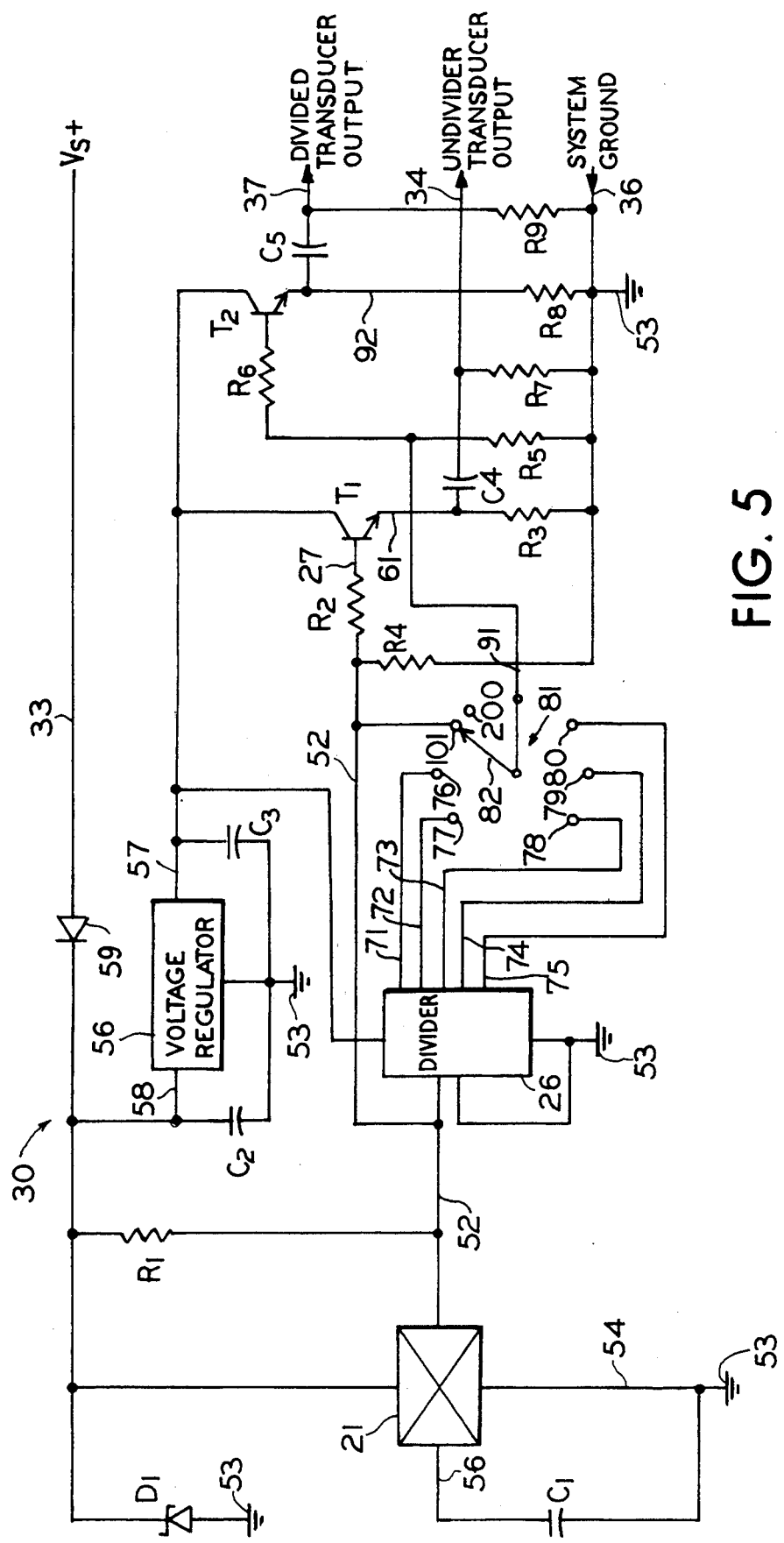
FIG. 5 is an electrical schematic view of the invention.

FIG. 5 is an electrical schematic diagram of the circuit of the transducer of the present invention. The circuit receives electrical power from the vehicle electrical system, or another appropriate source, on positive supply lead 33 and on ground lead 36. A suitable magnetic field detector 21 such as described above produces an output signal on lead 52. Such signal indicates in time whether or not a gear tooth or other ferromagnetic indicating component is near the detector.

The detector 21 receives power via leads 33 and ground 53. A capacitor C1 is connected between lead 56 of the detector 21 and ground 53. Capacitor C1 controls the time constant of a high-pass filter provided in the detector. Capacitor C1 is preferably a 4.7 uF, 10 V tantalum device; although other capacitance values may be used. Such variations will effect the time constant of the high-pass filter. A resistor R1, which may be 10K Ohm, acts as a pull-up resistor to bias the output lead 52 of the detector at a level near that of the positive supply lead 33. This resistor is required because the detector 21 has an "open-collector" output structure. A diode D1 is connected between resistor R1 and ground 53.

A voltage regulator device 56 provides a regulated internal power supply on lead 57 for use by other components. The voltage regulator device 56 is preferably a suitable three-terminal low power integrated voltage regulator, such as one of the industry-standard types 78L08 or 78L12, which are available from several manufacturers. However, other voltage regulators having a suitable output voltage and low power dissipation could also be used. Because the output from the voltage regulator 56 is used by certain other components which drive the output leads 34, 37, the voltage regulator must provide an output voltage usable by the receiving device, but below the maximum ratings of those other components. Because the circuit 30 is sealed and potted inside opening 24 of barrel 12, excess power dissipated by voltage regulator 56 could cause the transducer 21 to over-heat.

The input terminal 58 of voltage regulator 56 is connected to positive power supply lead 33 through a rectifier 59, which may be a type 1N4005. Rectifier 59 protects voltage regulator 56 from damage in case power of incorrect polarity is supplied to the transducer through leads 33, 36. Capacitor C2, which may be a 0.1 uF, 50 V monolithic ceramic device, is connected between voltage regulator input terminal 58 and ground 53 so as to filter the input to the voltage regulator. Capacitor C3, which may be a 22 uF, 16 V, tantalum device, is connected between voltage regulator output terminal 57 and ground 53 so as to filter the output of the voltage regulator.

A transistor T1 receives the detector output signal through resistor R2 on base lead 27 and provides a buffered version of that output on emitter lead 61. Transistor T1 is preferably a type 2N4401 NPN device, but other medium-power switching transistors could also be used. Resistor R2, which may be 10 K Ohm, limits the current supplied to the base of transistor T1. The collector of transistor T1 is connected to the internal regulated power supply lead 57. A Icad resistor R3, which may be 220 ohm, connects the emitter lead 61 of transistor T1 to ground 53.

When transistor T1 is biased into conduction by a "high" output signal from detector 21, emitter current flows through Icad resistor R3, and the voltage at the emitter lead 61 rises to about 0.7 volts below the voltage present on positive supply lead 33. When transistor T1 is biased at cutoff by a "low" output signal from detector 21, essentially no emitter current flows through Icad resistor R3, and the voltage at the emitter lead 61 drops to approximately that at ground lead 36. Transistor T1 thus provides additional output drive capability, which may be needed to drive certain receiving devices that present low-impedance loads.

Capacitor C4, which is preferably a 22 uF tantalum device, couples the emitter lead 61 of transistor T1 to the transducer's undivided output lead 34. Capacitor C4 allows the AC component of the detector output signal to pass to the transducer output lead 34, but it blocks the DC component. Resistor R4, which is preferably a 10 K ohm resistor, bleeds charge from capacitor C4 following positive-going output transitions.

A frequency divider 26 also receives the output signal from detector 21 on lead 52. The divider 26 is preferably a multi-stage binary "ripple" counter providing a plurality of output signals, each having a different predetermined frequency relationship with the input or clocking signal. For example, the divider 26 may be a 12-bit asynchronous binary counter commonly available from various manufacturers under the type designations 4040 or 14040. Other suitable counters or dividers could also be used. Divider means 26 receives power from the internal regulated power supply lead 57'.

Figure 2:
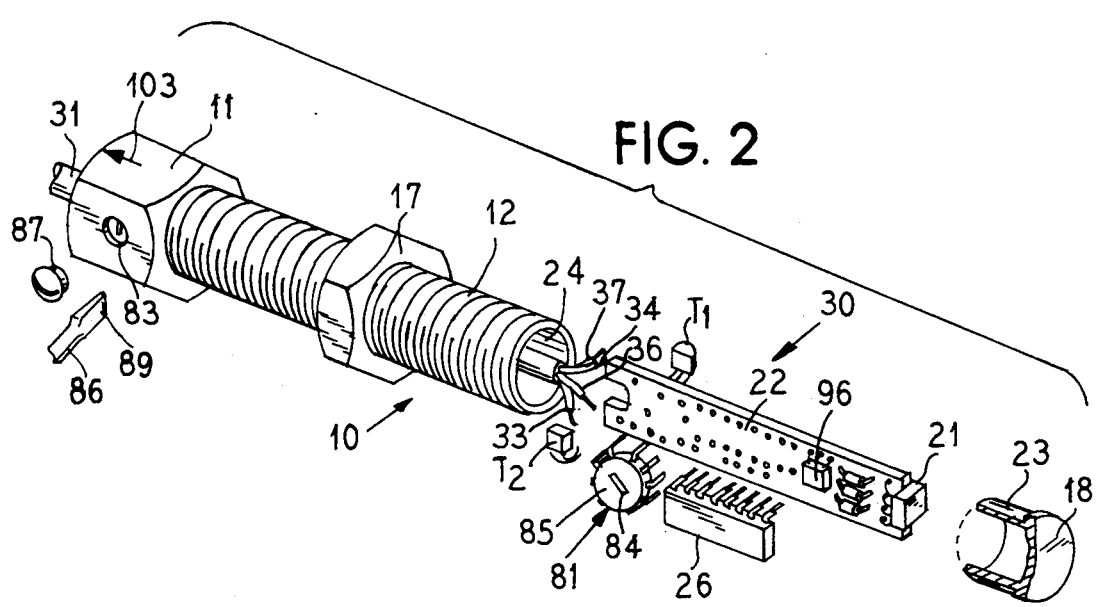
FIG. 2 is an exploded view of the invention illustrated in FIG. 1.

The divider 26 provides output signals on leads 71, 72, 73, 74 and 75 having pulse rates of f/2, f/4, f/8, f/16 and f/32 respectively, where f designates the pulse repetition rate, or frequency, present at the input lead 52. The specific division factors mentioned above are merely examples of factors believed to be useful with available vehicles and receiving devices. Other power-of-two division factors may also be obtained from divider 26, or counters having bases other than two could be used to provide other needed division factors. The output leads 71, 72, 73, 74 and 75 of the divider 26 are connected to stationary contacts 76, 77, 78, 79 and 80, respectively, of a rotary selector switch 81. Division ratios which appear on output lead 37 are selectable by means of the rotary contact 82 through an access hole 83, formed in the head 11 as shown in FIGS. 1–4. As shown in FIG. 2, the switch 81 is formed with a rotary member 85 that carries the rotary contact 82. A slot 84 is formed in rotary member 85 and when mounted is aligned with access hole 83 so that tool 86 can be inserted into slot 84 through access hole 83 to rotate member 85 and rotary contact 82. A sealing plug 87 is received in hole 83 except when tool 86 is to be used. Tool 86 has a flatted end 89 that mates with slot 84. The selected divided signal from rotary contact 82 is applied through lead 91 and resistor R6 to the base of transistor T2.

Transistor T2 connected as an emitter follower, receives the divided output signal of the rotary contact 82 on base lead 92 and provides a buffered version of that output on emitter lead 92. Transistor T2 is preferably a type 2N4401 NPN device, but other medium-power switching transistors could also be used. Resistor R6, which may be 10 K Ohm, limits the current supplied to the base of transistor T2. The collector of transistor T2 is connected to the internal regulated power supply lead 57. A load resistor R8, which may be 220 Ohm, connects the emitter lead 92 of transistor T2 to ground 53.

Capacitor C5, which is preferably a 22 uF tantalum device, couples the emitter lead 92 of transistor T2 to the divider transducer output 37. Capacitor C5 allows the AC component of the divider output signal to pass to the transducer output lead 37, but it blocks the DC component. Resistor R9, which is preferably a 10 K Ohm resistor, bleeds charge from capacitor C5 following positive-going output transitions.

The stationary contact 101 of switch 81 is unoccupied should no divided outputs be required. Selecting this position of switch 81 prevents any of the output signals from being applied to the base of transistor T2 resulting in no signal on lead 37. Conceivably a requirement exists for two separately buffered, undivided outputs at the same time. This requirement can be met by connecting detector lead 52 to the stationary contact 101 of switch 82. Connecting lead 52 to contact 101 and selecting that position with the rotary contact 82 connects the detector signal to the base of transistor T2 which in turn applies that signal to transducer output lead 37. In the preferred embodiment shown in FIG. 5, an undivided signal is available on the transducer output lead 34, and a divided output on transducer output lead 37.

Once a divided output has been selected the access hole 83 is sealed by plug 87 to protect the circuitry within transducer cavity 24 against dirt, moisture and other deleterious materials, as well as to safeguard against unauthorized tampering. The specific division factors mentioned here are merely examples of factors believed to be useful with available vehicles and receiving devices. Other power-of-two division factors may also be obtained from divider 26 or counters having bases other than two could be used to provide other needed division factors.

The indicia 103 on head 11 is used to initially install the transducer in the transmission housing as described above.

Figure 3:
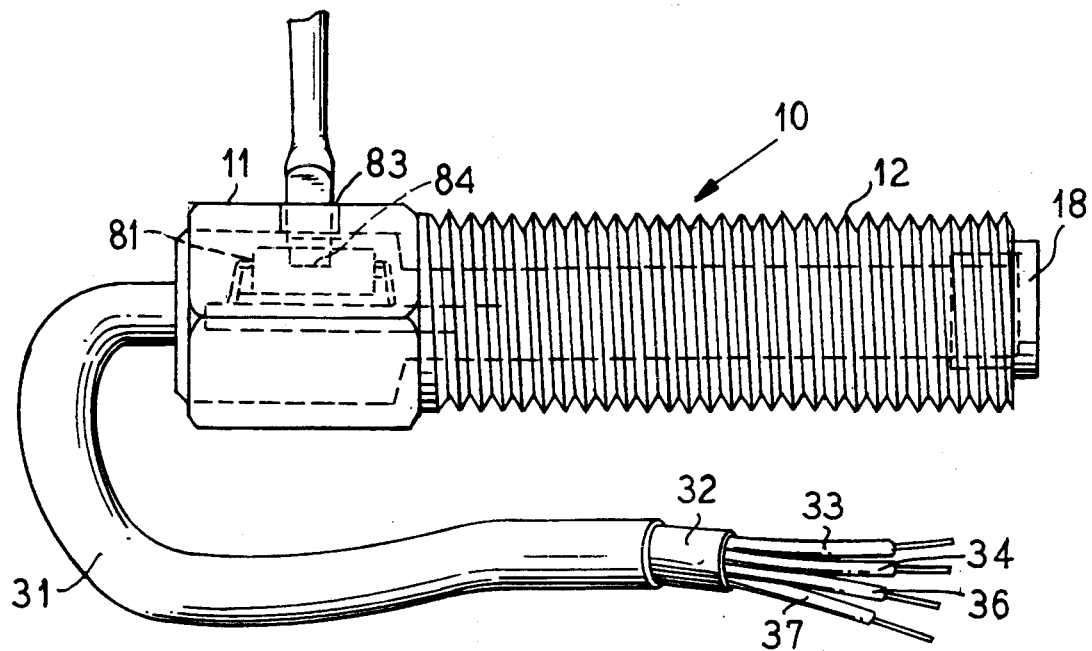
FIG. 3 is a partially cut-away plan view of the invention.

FIG. 3 illustrates the transducer 11 and shows the switch slot 84 aligned with the access opening 83.

Figure 4:
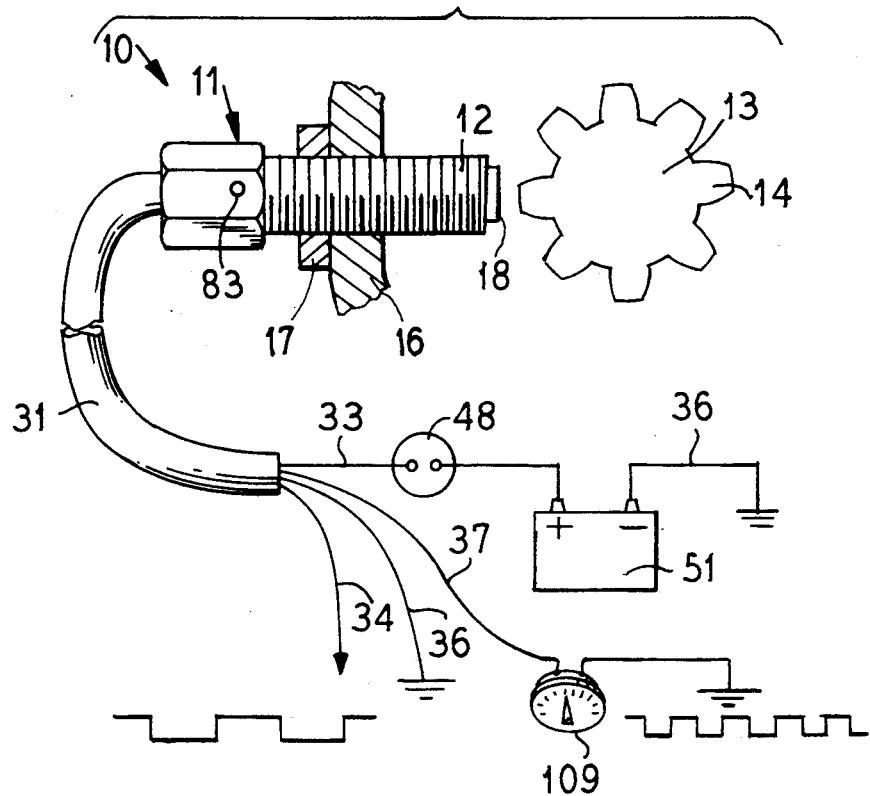
FIG. 4 is a schematic view illustrating the transducer adjacent the toothed wheel or gear.

FIG. 4 illustrates the undivided and the divided output from transducer 10. A battery 51 is connected through switch 48 to power lead 33. The negative terminal of the battery is grounded.

An indicator such as a speedometer 109 is connected to output lead 37. The speedometer 37 is calibrated for the selected divider output.

Although it has been described with respect to preferred embodiments, it is not to be so limited as changes and modifications can be made therein which are within the full intended scope as defined by the appended claims.

I claim as my invention:

1. A changeable divider and index for a vehicle speed and distance transducer, comprising a hollow bolt-shaped housing with a head and a threaded shaft extending from said head, a Hall effect transducer mounted inside said threaded shaft adjacent the end remote from said head and positioned to detect rotary motion of a gear which rotates when the vehicle moves, a divider mounted in said bolt-shaped housing and connected to said Hall effect transducer to produce a plurality of divided outputs, a selector switch with a stator connected to said divider and receiving said plurality of divided outputs thereon, a rotor of said selector switch which is moveable so as to select one of said plurality of divided outputs, an output lead which carries an electrical signal which indicates the .Speed and distance travelled of said vehicle connected to said rotor and extending through said hollow bolt-shaped housing, a slot formed in said rotor of said selector switch, an opening formed in said head through said hollow bolt-shaped housing and said opening aligned with said slot in said rotor of said selector switch such that said rotor can be rotated with a tool receivable through said opening to select different ones of said plurality of divided outputs, wherein said threaded shaft is threadedly received in a transmission housing so as to position said Hall effect transducer adjacent said gear, an index indicia on said bolt-shaped housing and a lock nut receivable on said threaded shaft for locking said bolt-shaped housing in a predetermined longitudinal position relative to said transmission housing, and including a plug receivable in said opening formed in said head.

* * * * *